Patented Nov. 5, 1935

2,019,676

UNITED STATES PATENT OFFICE 2,019,676

ENAMEL WARE

Oscar Hommel, Pittsburgh, Pa., assignor to Enamelers Guild, Inc., a corporation of Pennsylvania No Drawing. Application February 7, 1933, Serial No. 655,608

2 Claims. (Cl. 91—73)

My invention relates to the production of enamel ware, and the object in view is improvement in decorative appearance; and, more specifically, in the production of an enamel coating of wavy surface and of variegated colors, having an effect such as has heretofore been gained only in art pottery. This application is in part a continuation of an application filed by me June 20, 1931; Serial No. 545,854.

By enamel ware is meant an article of metal, ordinarily of steel—a cooking utensil, for example, a sign, a tile, or other article comparable in size with these—having a surface coating of enamel. Such ware is produced by preparing the enamel, grinding it, spreading it in pulverized condition upon the metal surface, and firing the so-prepared article. In firing, the particles of enamel fuse again, and form a coherent coating, with proper adhesion to the metal. The pulverized enamel is spread upon the metal either by grinding it with water and clay into a paste called a slip, in which the metal article is dipped, or by sifting it in dry pulverized condition upon the surface of the heated article. My invention contemplates an article which, in addition to being useful (a vase, for instance), is beautiful, both in variety of color that may be imparted to its enameled surface, and in variety of form. The surface possesses an uneven and waved character; and the article presents the appearance of an article of pottery-ware.

In the practice of my invention I prepare an enamel and one or more additional bodies of vitrifiable material, this other body or these other bodies differ from the enamel in character and from one another (and from the enamel as well) in color. The number of such additional bodies may be more than one; but, for purposes of simplicity, I shall describe the invention as involving essentially one such vitrifiable body to be employed with the enamel. These two bodies, the enamel and the second vitrifiable body, are unlike in specific gravity, and ordinarily are of different melting-points. Specifically and typically, the enamel may be a feldspathic glass, and the second vitrifiable body may consist of or include essentially a salt—lead borate, for example, or lead silicate. It may be, instead, a salt of bismuth (borate or silicate); or a salt of another metal, such as lithium; or it may be a salt of two or more metals, including those named, or one of those named, in association with sodium, for example. The enamel itself will have compounded with it suitable coloring matter (typically a metallic oxide) and the second vitrifiable body will similarly be combined with suitable coloring matter (ordinarily of contrasting color). The feldspathic glass may be compounded typically of the ingredients usually employed in enamel-ware making—borax, feldspar, silica, soda-ash, and cryolite. Following is an exemplary formula:

| | Parts by weight |
|---|---|
| Borax | 31½ |
| Feldspar | 32 |
| Silica | 8½ |
| Soda-ash | 7 |
| Sodium nitrate | 3 |
| Fluospar | 3 |
| Cryolite | 6 |
| Zinc oxide | 4 |
| Antimony oxide | 3 |

The second vitrifiable body may be compounded according to the following formula:

| | Parts by weight |
|---|---|
| Lead oxide | 39 |
| Boric acid | 10 |
| Feldspar | 2 |
| Soda-ash | 1 |
| Silica | 3 |
| Cobalt oxide | ½ |

This composition when fused will constitute a vitrified body, essentially of lead borate.

I so far anticipate the further description as to remark here that the specific gravity of the feldspathic glass of the formula given above is 2.5; while the specific gravity of the second vitrifiable body whose formula is given above is 4.09. The melting-point of the slip prepared of the feldspathic glass of the foregoing formula is approximately 1500° F.; the melting-point of the second vitrifiable body whose formula is given above is approximately 1000° F. The second vitrifiable body, modified in those respects contemplated above, will have a specific gravity in any case exceeding 3, and a melting-point in no case exceeding 1200° F.

The two bodies are properly colored, ordinarily in contrasting colors. The two formulae given above include, as will be perceived, color-imparting minerals. These two bodies are severally smelted in usual manner and one of them, ordinarily the feldspathic glass of the first formula, is dealt with in usual manner: it is ground fine and applied either in the form of a slip or by sifting. If a slip is to be formed, the glass is milled, together with clay and an opacifying agent, in substantially the typical proportions of 100 parts of glass, 6 parts of clay, and 6 parts of tin oxide (for example). The other body is crushed, not necessarily (and not ordinarily) to the same degree of fineness as the first, and particles of the second body in solid state are incorporated in the coating upon the ware. Such incorporation may be effected by stirring the particles of the second body into a slip formed of the first; or by dropping particles of the second body upon the coating formed upon the article by dipping it in the slip of the first (the coating at the time of such dropping being still soft, to the end that the dropped-on particles shall adhere to and be more or less completely incorporated in the coating); or, again, by dropping the particles of the second body as well as the particles of the first upon the heated surface of the metal article. The coated article, before firing, may receive an additional coating of clear enamel (by dipping or spraying). The effect of such additional coating will be to cause the particles of the second vitrifiable body to spread more widely upon or within the main enamel coating.

Firing follows. In the firing the coating substances fuse. The heavier and more readily fusible lead borate will fuse first, and will become the more fluid portion of the coating; nevertheless, the two substances will in some degree blend, and the fused coating will adhere to the underlying surface—perhaps of the metal itself, perhaps the surface of a previously applied enamel coat. In consequence of the inequalities of the melting-points, and inequalities of fluidity and of specific gravity, the masses of the two bodies, though they coalesce, will spread to form a coating of varying thickness; the heavier, more fluid constituent forming the thinner portions of the coating. In the finished article, therefore, a diversity of surface, an unevenness, a waviness, will be found; and this, preferably, in association with contrast in color, is pleasing in effect.

As has been said, if the article has received, in addition to the coating of pigmented vitrifiable materials, a coating of clear enamel, the spread of the heavier particles of one of the two pigmented bodies (ordinarily localized in spots) may be widened, with still more pleasing effect.

If during the firing operation the surface or surfaces upon which the coating is spread be in other than horizontal position of extent, there will be a gravitational relative movement of the component masses of the fused material, and such displacement will afford a further modification of the variegated effect. This further possibility of modifying the effect may be taken advantage of and the pleasing result thereby enhanced.

I have indicated that three or more bodies may in like manner be employed; and in such case the feldspathic glass may constitute the body of the coating and particles of metal salt, diverse in color one from another and from the feldspathic glass as well, may be introduced in such manner as has been described.

I claim as my invention:

1. The method herein described of forming upon a solid article an enamel coating of wavy surface and of variegated color, which consists in covering the surface of the article with a coating of a plurality of vitrifiable preparations, of which one is a feldspathic glass of specific gravity of substantially 2.5 and of one color, and another consisting essentially of a metallic salt of a group that consists of lead, bismuth and lithium, of specific gravity exceeding 3, and of another color, the preparations being applied in variegated distribution, and firing the coating.

2. The method herein described of forming upon a solid article an enamel coating of wavy surface and of variegated color, which consists in covering the surface of the article with a coating of a plurality of vitrifiable preparations, of which one is a feldspathic glass of specific gravity of substantially 2.5 and of a melting-point of substantially 1500° F. and of one color, and another is a lead-borate glass of specific gravity substantially 4.09 and of a melting-point of substantially 1000° F. and of another color, the preparations being applied in variegated distribution, and firing the coating.

OSCAR HOMMEL.